United States Patent
Jung et al.

(10) Patent No.: US 10,386,499 B2
(45) Date of Patent: Aug. 20, 2019

(54) DEVICE FOR DETERMINING A DEPOSITED DOSE AND ASSOCIATED METHOD

(71) Applicants: Centre National de la Recherche Scientifique, Paris (FR); Université de Strasbourg, Strasbourg (FR)

(72) Inventors: Jean-Marc Jung, Oberhausbergen (FR); Mauricio Nicolas Torres Ruiz, Strasbourg (FR)

(73) Assignees: Centre National de la Recherche Scientifique, Paris (FR); Université de Strasbourg, Paris (FR)

( * ) Notice: Subject to any disclaimer, the term of this patent is extended or adjusted under 35 U.S.C. 154(b) by 0 days.

(21) Appl. No.: 15/773,722

(22) PCT Filed: Nov. 14, 2016

(86) PCT No.: PCT/EP2016/077603
§ 371 (c)(1),
(2) Date: May 4, 2018

(87) PCT Pub. No.: WO2017/081324
PCT Pub. Date: May 18, 2017

(65) Prior Publication Data
US 2018/0321389 A1    Nov. 8, 2018

(30) Foreign Application Priority Data
Nov. 12, 2015  (FR) .................................. 15 60827

(51) Int. Cl.
*G01T 1/02*  (2006.01)
(52) U.S. Cl.
CPC ..................... *G01T 1/023* (2013.01)
(58) Field of Classification Search
CPC .......... G01T 1/20; G01T 1/023; G01T 1/2018
(Continued)

(56) References Cited

U.S. PATENT DOCUMENTS 5,856,673 A * 1/1999 Ikegami .................. G01T 1/202
  250/368
6,479,829 B1 * 11/2002 Katagiri .................... G01T 1/20
  250/390.11
(Continued)

FOREIGN PATENT DOCUMENTS

FR     2981757 A1   4/2013
WO   2013060745 A1   5/2013

OTHER PUBLICATIONS

Ettinger et al., New Trends in Scintillation Detection for Dose and Radiation Quality Monitoring Purposes, Radiation Protection Dosimetry, vol. 61, Issue 1-3, (Aug. 1, 1995), pp. 13-18, (abstract only).
(Continued)

*Primary Examiner* — David P Porta
*Assistant Examiner* — Blake C Riddick
(74) *Attorney, Agent, or Firm* — TraskBritt (57) ABSTRACT

A device for determining a dose deposited in a scintillator by an ionizing radiation, comprises: a scintillator configured to be irradiated by the ionizing radiation and capable of emitting scintillation photons during interaction with the ionizing radiation; a measurement device comprising a single photodetector, the photodetector being a low-noise photodetector, the determination device being configured in such a way that the photodetector functions in single photon counting mode, the photodetector supplying, at the output of same, a measurement of the total intensity of light received by the photodetector from the scintillator; and an analyzer configured to determine a dose deposited in the scintillator by the ionizing radiation from the total intensity alone of light measured by the photodetector and a predetermined constant dependent only on the scintillator, the light output of the determination device and the type of ionizing radiation.

20 Claims, 3 Drawing Sheets

(58) Field of Classification Search
USPC .................................. 250/361 R, 362, 370.11
See application file for complete search history.

(56) References Cited

U.S. PATENT DOCUMENTS

| | | | | |
|---|---|---|---|---|
| 7,538,329 | B2* | 5/2009 | Chen | A61B 5/0059 250/370.07 |
| 7,657,001 | B2* | 2/2010 | Van De Haar | A61B 6/583 378/114 |
| 7,737,401 | B2* | 6/2010 | Iwatschenko-Borho | G01T 1/023 250/339.02 |
| 9,244,178 | B2* | 1/2016 | Jung | G01T 1/2006 |
| 2002/0131552 | A1* | 9/2002 | Nishizawa | A61B 6/583 378/65 |
| 2003/0163016 | A1* | 8/2003 | Testardi | A61N 5/1048 600/2 |
| 2007/0012879 | A1* | 1/2007 | Testardi | G01T 1/161 250/361 R |
| 2007/0280420 | A1* | 12/2007 | Jahrling | G01T 1/02 378/98.8 |
| 2010/0038547 | A1* | 2/2010 | Ishikawa | A61N 5/1048 250/369 |
| 2011/0303850 | A1* | 12/2011 | Barillon | C07D 413/10 250/362 |
| 2015/0293235 | A1* | 10/2015 | Cameron | G01T 1/023 250/361 R |
| 2017/0184730 | A1* | 6/2017 | Zygmanski | G01T 1/28 |

OTHER PUBLICATIONS

International Search Report for International Application No. PCT/EP2016/077603 dated Jan. 30, 2017, 3 pages.
International Written Opinion for International Application No. PCT/EP2016/077603 dated Jan. 30, 2017, 6 pages.
Munier, Melodie, Nouvelles Molecules Organiques Scintillantes a Base de Liquides Ioniques Pour la Detection et la Discrimination des Rayonnements Nucleaires, Instrumentations et Détecteurs [physics. ins-det]. Université de Strasbourg, (2011), pp. 113-115.

* cited by examiner

DEVICE FOR DETERMINING A DEPOSITED DOSE AND ASSOCIATED METHOD

CROSS-REFERENCE TO RELATED APPLICATIONS

This application is a national phase entry under 35 U.S.C. § 371 of International Patent Application PCT/CA2016/077603, filed Nov. 14, 2016, designating the United States of America and published as International Patent Publication WO 2017/081324 A1 on May 18, 2017, which claims the benefit under Article 8 of the Patent Cooperation Treaty to French Patent Application Serial No. 15 60827, filed Nov. 12, 2015.

TECHNICAL FIELD

The present application relates to a device for determining a deposited dose and a method for determining the associated deposited dose.

BACKGROUND

A device for determining a dose deposited in a scintillator is known from the document EP 2 771 716, which comprises a first photodetector and a second photodetector, with the second photodetector operating in single counting mode. The dose deposited in the scintillator by the ionizing radiation is deduced from the number of coincidence events counted by the device, with each coincidence event corresponding to the detection of a photon by the first photodetector, followed by the detection of a photon by the second photodetector operated in single photon counting mode.

Manufacturing this device is expensive because of the presence of two photodetectors. Moreover, it requires relatively complex analysis and counting electronics, which results in high energy consumption. Eventually, sensitivity is limited because it operates by counting coincidence events, which takes into account only a small part of available information.

BRIEF SUMMARY

One object of the disclosure is to provide a device making it possible to determine, in real time, the dose deposited in a scintillator by an ionizing radiation with a higher sensitivity and at lower cost.

For this purpose, the disclosure relates to a device for determining a dose deposited in a scintillator by an ionizing radiation, comprising:
- a scintillator so configured as to be irradiated by the ionizing radiation and capable of emitting scintillation photons during the interaction with the ionizing radiation;
- a measurement device comprising a single photodetector, with the photodetector being a low-noise photodetector, with the determination device being configured in such a way that the photodetector operates in single photon counting mode, with the photodetector supplying, at the outlet of the same, a measurement of the total intensity of light received by the photodetector from the scintillator; and
- an analyzer so configured as to determine a dose deposited in the scintillator by the ionizing radiation only from the total intensity of light measured by the photodetector and a predetermined constant depending on the scintillator, the light output of the determination device and the type of the ionizing radiation only.

The device may include one or more of the following characteristics, either taken separately or in any technically possible combination:
the analyzer is so configured as to determine:
the ionizing dose deposited in the scintillator by the ionizing radiation by applying the following formula: $D_{ion}(E) = \alpha_1 \times I_{total}(E)$, where E is the energy of the incident ionizing radiation, $I_{total}(E)$ is the total intensity of light measured by the photodetector and $\alpha_1$ is a predetermined constant depending on the scintillator, the light output of the determination device and the type of the ionizing radiation only; and/or
the exciting dose ($D_{exc}(E)$) deposited in the scintillator by applying the following formula: $D_{exc}(E) = \alpha_2 \times I_{total}(E)$, where E is the energy of the incident radiation, $I_{total}(E)$ is the total intensity of light measured by the photodetector and $\alpha_2$ is a predetermined constant depending on the scintillator, the light output of the determination device and the type of the ionizing radiation only; and/or
the total dose deposited in the scintillator by applying the following formula: $D_{total}(E) = \alpha_3 \times I_{total}(E)$, where E is the energy of the incident radiation, $I_{total}(E)$ is the total intensity of light measured by the photodetector and $\alpha_3$ is a predetermined constant depending on the scintillator, the light output of the determination device and the type of the ionizing radiation only.
the constant $\alpha_1$ corresponds to the slope of a calibration line established for the type of the ionizing radiation considered and for the determination device, and giving the ionizing dose measured for the scintillator using an ionization chamber according to the total intensity measured for the same scintillator, using the determination device;
the predetermined constant $\alpha_2$ is calculated by applying the following formula:

$$\alpha_2 = \left(\frac{1}{\rho V Q a} - \alpha_1\right),$$

where $\rho$ is the specific gravity of the scintillator, expressed in kg/m³, V is the irradiated volume of the scintillator, expressed in m³, Q is the total fluorescence yield expressed as the total number of fluorescence photons emitted by the scintillator per unit of deposited energy, i.e., in J⁻¹ and $\alpha_1$ is a constant corresponding to the slope of a calibration line established for the type of the ionizing radiation considered and for the determination device, and giving the ionizing dose measured for the scintillator using an ionization chamber according to the total intensity measured for the same scintillator, using the determination device;
the predetermined constant $\alpha_3$ is determined by applying the following formula: $\alpha_3 = (\alpha_1 + \alpha_2)$, where the predetermined constant $\alpha_2$ is calculated by applying the following formula:

$$\alpha_2 = \left(\frac{1}{\rho V Q a} - \alpha_1\right),$$

where ρ is the specific gravity of the scintillator, expressed in kg/m³, V is the irradiated volume of the scintillator, expressed in m³, Q is the total fluorescence yield expressed as the total number of fluorescence photons emitted by the scintillator per unit of deposited energy, i.e., in J⁻¹, and $\alpha_1$ is a constant corresponding to the slope of a calibration line established for the type of the ionizing radiation considered and for the determination device, and giving the ionizing dose measured for the scintillator using an ionization chamber according to the total intensity measured for the same scintillator, using the determination device;

the determination device further comprises an attenuator intended to attenuate the incident radiation on the photodetector so as to ensure the operation of the photodetector in single photon counting mode;

the attenuator comprises:
  an upstream attenuator arranged upstream from the scintillator and so configured as to absorb a portion of the incident ionizing radiation on the scintillator; and/or
  a downstream attenuator arranged downstream from the scintillator between the scintillator and the photodetector and so configured as to absorb a portion of the radiation emitted by the scintillator toward the photodetector;

the attenuator comprises an element made of a material capable of absorbing the incident ionizing radiation, with the element being arranged upstream from the scintillator in the path of the incident radiation on the scintillator;

the attenuator comprises a diaphragm arranged at the photodetector inlet, with the physical aperture of the diaphragm having an area smaller than the physical aperture of the photodetector;

the scintillator is an organic scintillator, preferably made of p-terphenyl or anthracene; and the determination device further comprises a transmission member so configured as to transmit the scintillation photons emitted by the scintillator to the photodetector, with the transmission member preferably comprising an optical fiber connecting the scintillator to the photodetector.

The disclosure also relates to a method for determining a dose deposited in the scintillator by the ionizing radiation using a determination device as defined above, comprising:

measuring, using a single photodetector operating in single photon counting mode and with low noise, the total intensity of light received by the photodetector;

determining, using an analyzer, a dose deposited in the scintillator by the ionizing radiation from the total intensity of light measured by the photodetector only and a predetermined constant depending on the scintillator, the light output of the determination device and the type of the ionizing radiation only.

According to a particular characteristic of the method, the step of determination comprises:

determining the ionizing dose deposited in the scintillator by the ionizing radiation by applying the following formula:

$$D_{ion}(E) = \alpha_1 \times I_{total}(E),$$

where $\alpha_1$ is a predetermined constant depending on the scintillator, the light output of the determination device and the type of the ionizing radiation only;

$I_{total}(E)$ is the total intensity of light measured by the photodetector; and/or determining the exciting dose deposited in the scintillator by the ionizing radiation by applying the following formula:

$$D_{exc}(E) = \alpha_2 \times I_{total}(E),$$

where $I_{total}(E)$ is the total intensity measured by the photodetector and $\alpha_2$ is a predetermined constant depending on the scintillator, the light output of the determination device and the type of the ionizing radiation only; and/or determining the total dose deposited in the scintillator by the ionizing radiation by applying the following formula:

$$D_{total}(E) = \alpha_3 \times I_{total}(E),$$

where $I_{total}(E)$ is the total intensity of light measured by the photodetector; and $\alpha_3$ is a predetermined constant depending on the scintillator, the light output of the determination device and the type of the ionizing radiation only.

BRIEF DESCRIPTION OF THE DRAWINGS

The disclosure will be better understood from reading the following description given purely by way of example and while referring to the accompanying drawings, wherein.

DETAILED DESCRIPTION

Figure 1:
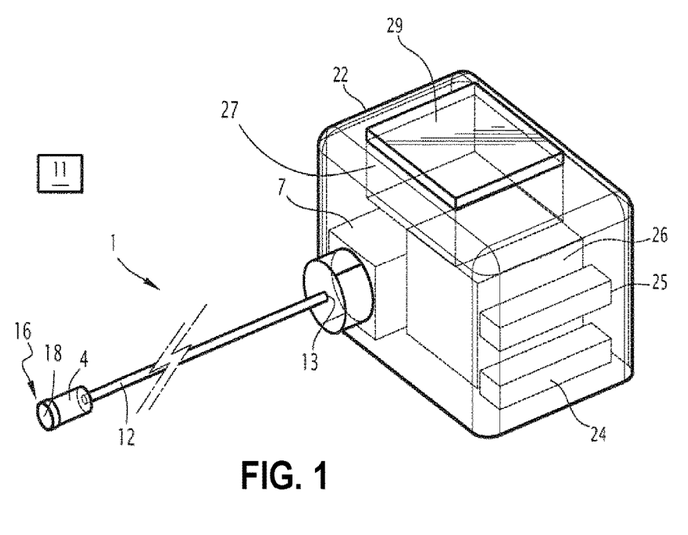
FIG. 1 is a schematic representation of a device for determining a dose deposited in a scintillator.

FIG. 1 schematically illustrates an exemplary device 1 for determining the dose deposited in a scintillator 4 by an ionizing radiation according to the disclosure.

The determination device 1 comprises:
  a scintillator 4 so configured as to be irradiated by the ionizing radiation and capable of emitting scintillation photons during the interaction with the ionizing radiation;
  a measurement device comprising a single photodetector 7; and
  an analyzer 10 so configured as to determine the dose deposited in the scintillator 4 by the ionizing radiation from the measurements performed by the single photodetector 7.

The ionizing radiation is a particle radiation or electromagnetic radiation (photons), such as an X-ray or a gamma-ray radiation. In the case of a particle radiation, the particles are charged particles, more particularly, electrons, protons, alpha particles or ions, or uncharged particles, specifically neutrons, for instance, neutrons producing charged particles in the scintillator such as through a nuclear reaction (n, p). The secondary electrons, originating from the primary ionizing interactions of the above-mentioned radiations with the scintillator 4, are also detected.

X radiations, gamma radiations, electrons, protons, alpha particles, ions, neutrons, and secondary electrons correspond to different types of radiation within the scope of the present patent application.

The radiation is a discontinuous radiation, for example, a pulsed or a continuous radiation.

The source 11 is any source adapted to emit an ionizing radiation as defined above. The source 11 is, for example, a particle accelerator, an artificial or natural radionuclide, a component of a nuclear facility, such as a nuclear reactor, nuclear waste, a fissile material intended for civil or military application, a medical X-ray generator, including an imaging or therapy device, or a research X-ray generator, such as a synchrotron. In the embodiment shown, the source 11 is configured in such a way as to emit a directional or collimated ionizing radiation beam. According to an alternative embodiment, the source 11 is capable of emitting an isotropic or non-isotropic 4 pi steradian ionizing radiation.

The scintillator 4 is an organic or inorganic scintillator. For example, the scintillator 4 is made of anthracene or p terphenyl, or of an organic material comprising p-terphenyl or anthracene, or of an inorganic material, such as thallium (NaI(Tl))-doped sodium iodide, bismuth germanate (BGO), lutetium oxyorthosilicate (LSO), lutetium and yttrium oxyorthosilicate (LYSO).

The scintillator 4 is so selected as to emit light with a wavelength within the range of wavelengths, which the photodetector 7 is sensitive to. The scintillator 4 emits in the ultraviolet, for example.

In the example shown in FIG. 1, the scintillator 4 is provided as a scintillating optical fiber. However, the scintillator 4 can have any other suitable form, for instance, the shape of a sheet or a cylindrical or parallelepipedic shape, according to the application that the determination device 1 is intended for. The scintillator 4 may also be in the liquid phase at room temperature, such as benzene or xylene or diluted in a non-scintillating solvent, for instance, p-terphenyl diluted in an alkane or an alcohol.

Optionally, the determination device 1 further comprises a member 12 transmitting light from the scintillator 4 to the photodetector 7. In the example shown in FIG. 1, the transmission member 12 comprises a transparent optical fiber connecting the scintillator 4 to the photodetector 7.

The determination device 1 is configured in such a way that the photodetector 7 receives the scintillation photons only emitted by the scintillator 4.

For this purpose, the scintillator 4 is, for example, arranged in a light-sealed enclosure, i.e., it prevents the light from outside the enclosure to enter the enclosure and it also prevents the light generated in the enclosure to go out of the enclosure. The photodetector 7 is arranged in such a way as to receive at least some of the scintillation photons emitted by the scintillator 4 in the enclosure.

In the embodiment wherein a transparent optical fiber connects the scintillator 4 to the photodetector 7, the optical fiber is preferably coated with a light-sealed sheath. The sheath is, for example, attached to the optical fiber. This is, for example, a thermo-retractable sheath. According to an alternative embodiment, the sheath consists of a coating formed on the optical fiber, for example, by evaporation.

In the embodiment shown in FIG. 1 wherein the scintillator 4 is in the form of a scintillating optical fiber fixed to the end of a transparent optical fiber, the light-sealed sheath advantageously also covers the scintillator 4.

According to an alternative embodiment, a band-pass filter, so configured as to let through only the scintillator 4 emission wavelength, is positioned at the photodetector 7 inlet. For example, the filter is an interferometric filter. In this case, the photodetector 7 only receives the scintillation photons from the scintillator 4, even though both the scintillator 4 and the photodetector 7 are positioned in the light.

The determination device 1 includes a central processing unit 27 adapted to run applications required for operating the determination device 1.

For this purpose, the central processing unit 27 comprises a processor and one or more memories.

The processor is adapted to run applications contained in the memory, specifically an operating system enabling the conventional operation of a computer system.

The memory comprises different memory areas, more particularly containing the analyzer 10, in the form of a computer program intended to be implemented by the processor, and a data memory 28 containing the characteristic parameters of the determination device 1, which will be described in greater detail below.

In the example shown in FIG. 1, the photodetector 7, and the processing unit 27 are integrated in a protective housing 22. This protective housing 22 has, for example, a side length of about 15 cm.

Optionally, the determination device 1 also comprises means of communication with a digital network, for example, via a USB port 24 or via wireless communication means 25 or an Ethernet port integrated in the protective housing 22.

In the example shown, the determination device 1 comprises means for supplying power to the processing unit 27, the photodetector 7 and any communication means. For example, these power supply means comprise a USB port 24, integrated in the protective housing 22. The assembly is intended to be connected to a power source, for example, to a computer via a USB connection or via a voltage transformer housing connected to the USB port 24.

According to an alternative embodiment, the processing unit 27, the photodetector 7 and the communication means 25, if any, are supplied with power via a battery 26 integrated in the protective housing 22. The device then operates independently.

In the embodiment shown, the determination device 1 further comprises a screen 29 adapted to display information from the processing unit 27.

The photodetector 7 is so configured as to receive at least a portion of the light emitted by the scintillator 4 under the effect of irradiation by the ionizing radiation and to measure the intensity of the received light.

According to the disclosure, the determination device 1 is so configured that the photodetector 7 operates in single photon counting mode. Single photon counting mode means that the photodetector 7 receives only one photon at a time. In other words, the exposure of the photodetector 7 to the light emitted by the scintillator 4 is such that the probability that the photodetector 7 receives two scintillation photons at the same time is less than or equal to 0.01 (1%).

For this purpose, the measurement device preferably comprises an attenuator intended to attenuate the incident radiation on the photodetector 7 in order to ensure the operation of the photodetector 7 in single photon counting mode.

The attenuator comprises:
- a downstream attenuator 13 arranged downstream from the scintillator 4, between the scintillator 4 and the photodetector 7, and so configured as to absorb a portion of the radiation emitted by the scintillator 4; and/or
- an upstream attenuator 16 arranged upstream from the scintillator 4 and so configured as to absorb a portion of the incident radiation on the scintillator 4.

The downstream attenuator 13 is formed by any means capable of sufficiently attenuating the incident light from the scintillator 4 on the photodetector 7.

For example, the downstream attenuator 13 is a diaphragm arranged at the inlet of photodetector 7 in the path of the radiation emitted by the scintillator 4. The diaphragm is configured in such a way as to restrict the inlet aperture of the photodetector 7 so that the photodetector 7 receives the photons passing through the diaphragm only. Thus, the physical aperture of the diaphragm is strictly smaller than the physical aperture of the photodetector 7. This diaphragm consists, in one example, in a single slot arranged at the photodetector 7 inlet in order to limit the inlet aperture thereof. Such a slot has, for example, a circular contour. According to an alternative embodiment, it may have a square or rectangular contour or any suitable contour. According to one embodiment, the diaphragm has an adjustable, optionally electrically controlled, aperture.

According to an alternative embodiment, the downstream attenuator 13 is a screen made of a semi-transparent material suitable for the wavelength of the scintillation light. According to an alternative embodiment, it may be in the form of a stack of semi-transparent screens.

According to an alternative embodiment, the downstream attenuator 13 is an interferometer formed by two quarter-wave plates adapted to the wavelength of the scintillation light. Such interferometric device is manually or electrically controlled.

According to an alternative embodiment, the downstream attenuator 13 is a liquid crystal display that is electrically controlled, the opacification of which results from a change in the orientation of the crystals under the effect of an electric field.

According to an alternative embodiment, the downstream attenuator 13 consists of a suitable fold formed in the optical fiber 12 transmitting the radiation between the scintillator 4 and the photodetector 7.

In general, the downstream attenuator 13 may be formed by any other device capable of attenuating the radiation emitted by the scintillator 4.

The upstream attenuator 16 is interposed in the path of the incident radiation on the scintillator 4, between the scintillator 4 and the radiation source 11.

In the example illustrated in FIG. 1, the upstream attenuator 16 has an attenuation plate 18 made of a material capable of absorbing a constant proportion of the incident radiation.

The material of the attenuation plate 18 is selected according to the nature of the ionizing radiation.

For example, when the incident radiation is a gamma radiation or an X-ray radiation, the attenuation plate 18 is specifically made of lead or aluminum.

According to an alternative embodiment, when the incident radiation is a proton or alpha radiation, it may be a metal coating, for example, with gold, having a thickness adapted to the attenuation properties of the material, provided on the scintillator 4.

According to an alternative embodiment, when the incident radiation is an electron radiation, the attenuation plate 18 consists, for example, of a sheet made of plastic or a metallic material having a suitable thickness.

In the example shown in FIG. 1, the attenuation plate 18 is attached to the scintillator 4 so as to be in the path of the ionizing radiation.

As an alternative to the attenuation plate 18, the upstream attenuator 16 consists of an attenuation element surrounding the scintillator 4 over at least a part of the length thereof and made of a material capable of absorbing a constant proportion of the incident radiation. For example, such an element is in the form of a ring, a coating or a sheet surrounding the scintillator 4. These elements may be made in the materials described above for the attenuation plate 18.

According to an alternative embodiment, the upstream attenuator 16 consists of any other device capable of attenuating the ionizing radiation upstream from the scintillator 4.

The attenuation required for the photodetector 7 to operate in single photon counting mode depends on the type of the ionizing radiation, the nature and dimensions of the scintillator 4 and the sensitivity of the photodetector 7.

In the determination device 1 according to the disclosure, the attenuator is selected according to the type of the ionizing radiation, the sensitivity of the photodetector 7 and the nature and dimensions of the scintillator 4 in such a way that the photodetector 7 operates in single photon counting mode.

In particular, depending on the type of the ionizing radiation, the nature and dimensions of the scintillator 4 and the sensitivity of the photodetector 7, the implementation of an upstream attenuator 16 only or of a downstream attenuator 13 only may be sufficient to obtain the single counting mode at the photodetector 7.

In the case where the determination device 1 comprises a downstream attenuator 13 and/or an upstream attenuator 16 as described above, the selection of the attenuator comprises the adjustment of the attenuation level by the downstream attenuator 13 and, in particular, the selection of the dimensions of the aperture of the downstream attenuator 13 diaphragm and/or the adjustment of the attenuation level by the upstream attenuator 16 and, in particular, the selection of the thickness of the attenuation material 18, in order to obtain an operation of the photodetector 7 in single photon counting mode.

The skilled person is able to select the attenuator through a limited number of experiments based on the type of the ionizing radiation, the nature and the dimensions of the scintillator 4 and the sensitivity of the photodetector 7. In particular, it is capable of determining whether a downstream attenuator 13 alone or an upstream attenuator 16 alone is sufficient or whether a downstream attenuator 13 and an upstream attenuator 16 should be used, as well as the required dimensions for such downstream 13 and/or upstream 16 attenuation devices, so that the photodetector 7 operates in single photon counting mode.

For example, for a downstream attenuation slot having given dimensions, the skilled person can vary the thickness of the attenuation plate 18 to obtain a single photon counting mode. According to an alternative embodiment, for an attenuation plate 18 with a given thickness, the skilled person can vary the dimensions of the attenuation slot until a single photon counting mode is obtained.

For example, for an irradiation with X-rays having an energy between 80 kV and 140 kV, with a p-terphenyl-based scintillator 4 with a volume approximately equal to 150 mm$^3$ and a weight equal to 76.2 mg, a circular slot having an area of about 0.5 mm$^2$ may be used in combination, as a downstream attenuator 13, with a lead-made plate having a thickness of 0.5 mm, as an upstream attenuator 16.

One method for checking whether the photodetector 7 operates in single photon counting mode comprises connecting the outlet of the photodetector 7 to an oscilloscope and further comprising observing the amplitude of the pulses at the outlet of the photodetector 7. The photodetector 7 operates in single photon counting mode if the amplitude of such pulses is substantially constant and corresponds to the reception of a single photon. As a matter of fact, the amplitude of the pulses is proportional to the number of photons detected simultaneously.

In some cases, especially for sparsely ionizing radiations, the photodetector 7 operates in single photon counting mode without any attenuation. In this case, the determination device 1 may not include an attenuator.

For example, in the case of an anthracene- or p-terphenyl-based scintillator 4, with a radiation consisting of gamma photons from a standard source of cesium 137 (662 keV), the total activity of which amounts to 400 kBq, positioned 10 cm away from the scintillator 4, no attenuator is required to obtain the single photon counting mode.

The photodetector 7, for example, consists of a photo-electric electron-multiplier tube. According to an alternative embodiment, it is a micro-channel plate (MCP) photoelectric electron-multiplier or a semiconductor detector.

The photodetector 7 is a low-noise photodetector and, in particular, a photodetector, the dark count of which is less than or equal to 1% of the counted total signal. For example, the photodetector 7 is a Hamamatsu low-noise photodetector of the low-noise Multi-Pixel Photon Counter (MPPC) type.

The photodetector 7 provides, at the outlet thereof, a measure of the total intensity $I_{total}(E)$ of light received from the scintillator 4, which corresponds to the total number of luminescence photons counted during the duration of the measurement, under an incident radiation having an energy E.

Figure 2:
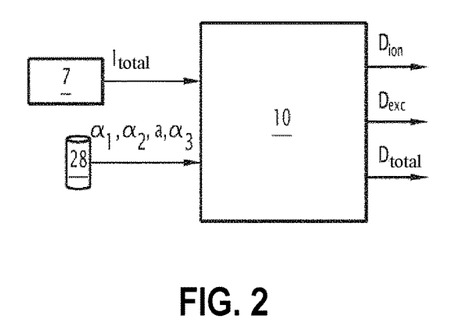
FIG. 2 is a block diagram illustrating the inputs and outputs of an analyzer of the device of FIG. 1.

The inlet of the processing unit 27 is connected to the outlet of the photodetector 7. The analyzer 10 receives and counts the electric pulses from the photodetector 7. The sum of the electrical pulses counted by the analyzer 10 corresponds to the sum of single photons detected by the photodetector 7 for the duration of the measurement. Such sum is the total intensity $I_{total}(E)$ of luminescence measured by the photodetector 7, too.

The duration of the measurement varies according to the nature and intensity of the radiation received by the scintillator 4, the nature of the scintillator 4 and the configuration and adjustment parameters of the upstream 16 and/or downstream 13 attenuation devices, the characteristics of the photodetector 7 and the counting speed of the analyzer 10.

For example, it ranges from 0.1 second to 1 second for medical X-rays and from 60 to 120 keV, for an analyzer operating in nanosecond resolution. The duration of the measurement depends on the selection of the upstream 16 and/or downstream 13 attenuators. For a fixed attenuation, the person skilled in the art sets the duration of the measurement so that the relative uncertainty on the value obtained is less than or equal to 1%.

The value $I_{total}(E)$, as measured by the photodetector 7, is the product of the intensity I(E) of light emitted by the scintillator 4, by the light output a of the determination device, i.e., $I_{total}(E)=a \times I(E)$.

The dimensionless light output a, between 0 and 1, takes into account the constant effects associated with the geometry of the determination device 1 and, in particular, with the geometry of the upstream 16 and/or downstream 13 attenuation devices, as well as the constant light output of the photodetector 7 during the measurement. The skilled person is able to determine the value of the light output a, for a given geometric configuration and for a given photodetector 7 using a limited number of tests.

The processing unit 27 comprises a data memory 28 containing predetermined parameters that depend on the scintillator 4 and on the light output of the determination device 1 only. These parameters include a predetermined proportionality factor $\alpha_1$, which depends on the scintillator 4, the light output a of the determination device 1 and the type of the ionizing radiation only.

The proportionality factor $\alpha_1$ corresponds to the ratio for a given scintillating material, of an ionizing dose $D_{ion}(E)$ on the light intensity $I_{total}(E)$:

$$\alpha_1 = \frac{D_{ion}(E)}{I_{total}(E)}.$$

The ionizing dose $D_{ion}(E)$ is the dose resulting from the ionization of the scintillating molecules of the scintillator 4 by the ionizing radiation.

The proportionality factor $\alpha_1$ is a constant that depends on the scintillator 4 used, the light output a of the determination device 1 and the type of the ionizing radiation only.

For example, a method for measuring the proportionality factor $\alpha_1$ for a given scintillator 4 comprises determining a calibration line $D_{ion}(E)=\alpha_1 \times I_{total}(E)$ by determining the $I_{total}(E)$ and $D_{ion}(E)$ pairs for a given type of radiation with different energies E. For this purpose, the dose deposited in a scintillator 4, for a period of irradiation d by an ionizing radiation having energy E set using a calibrated ionization chamber, is determined. The dose thus obtained corresponds to the ionizing dose $D_{ion}(E)$ deposited in the scintillator 4 by the ionizing radiation during the period d. For the same type of radiation, the same energy E, the same scintillator 4 and the same duration d, the total intensity $I_{total}(E)$ of light emitted by the scintillator 4 and received by the photodetector 7 is measured using the determination device 1 according to the disclosure.

Such operations are then repeated, using different energies E, all things being otherwise equal, which makes it possible to identify the $D_{ion}(E)$, $I_{total}(E)$ pairs associated with each such energy, and the calibration line mentioned above is then drawn. The proportionality factor $\alpha_1$ for the particular type of radiation corresponds to the slope of the line.

Figure 3:
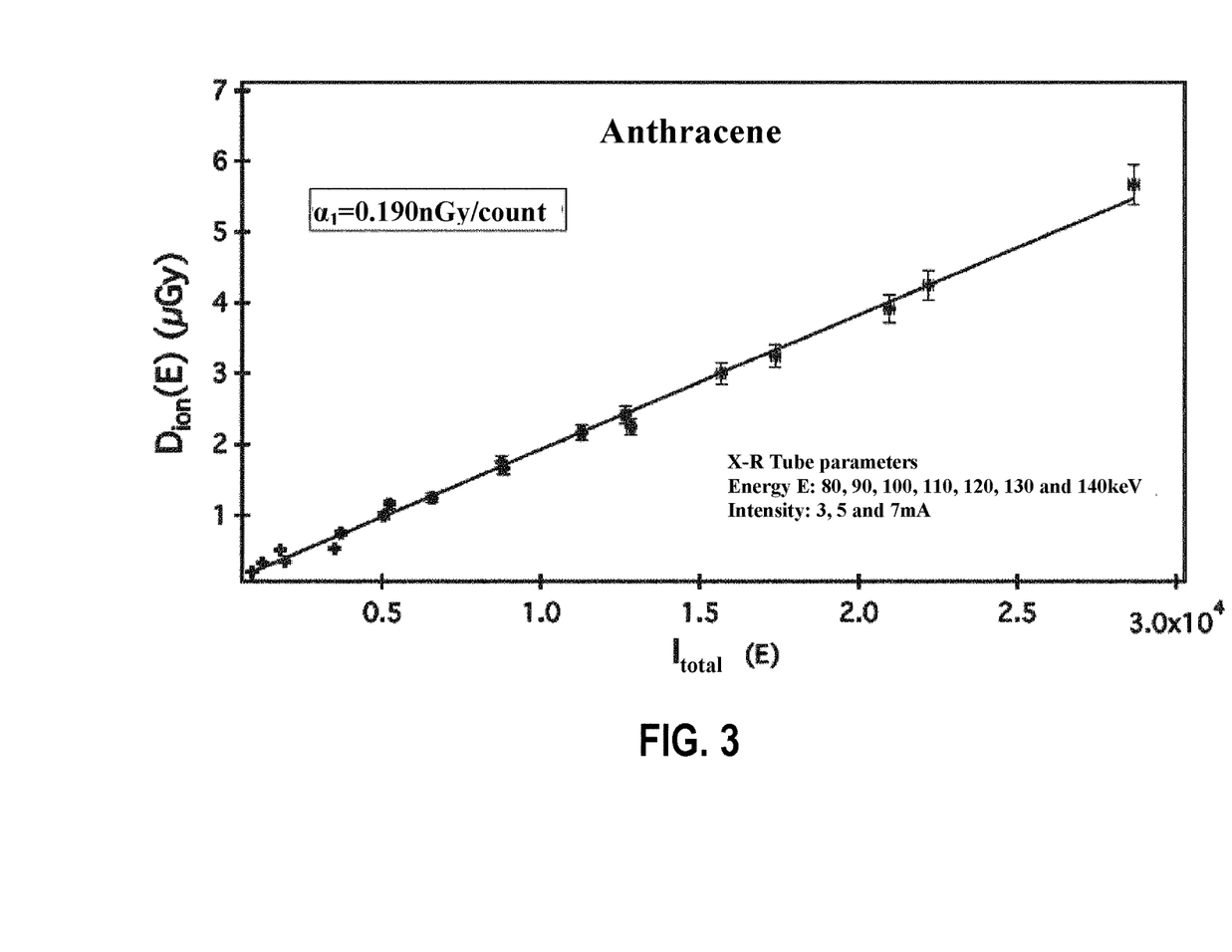
FIGS. 3 and 4 are graphs showing the calibration lines obtained in a laboratory for anthracene and p terphenyl, respectively.
Figure 4:
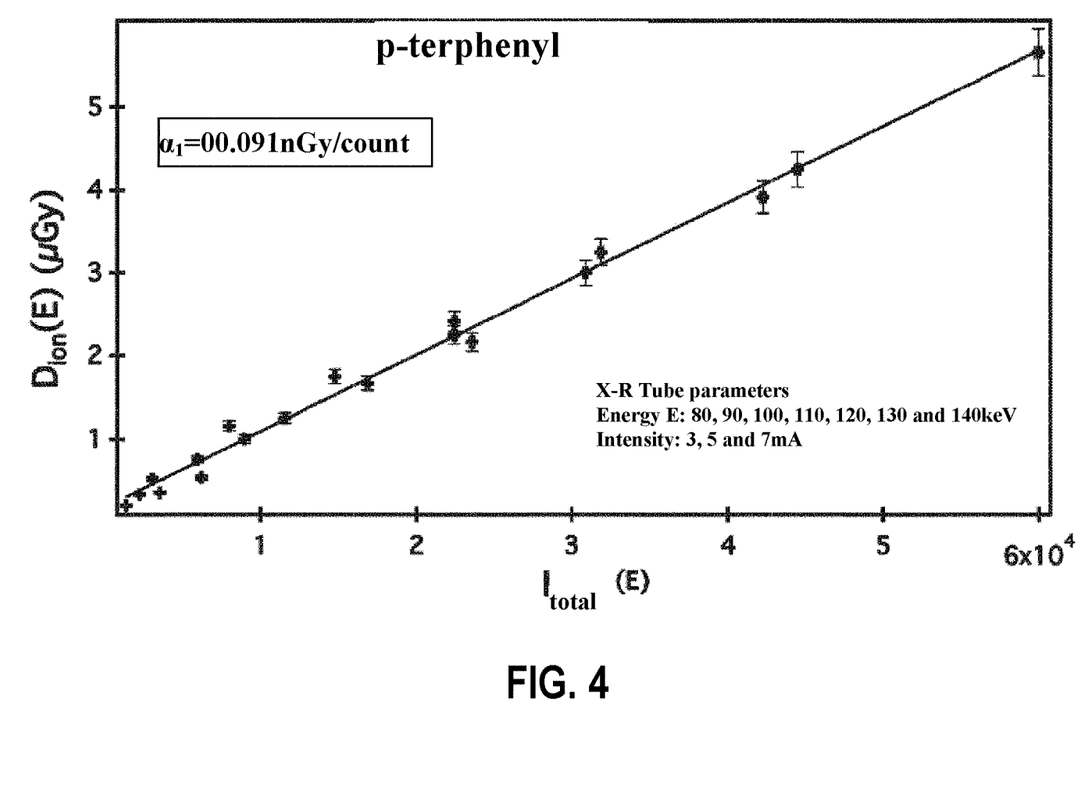

The inventors have made such experiments in a laboratory for anthracene and p-terphenyl as template scintillating molecules. The calibration lines obtained are shown in FIGS. 3 and 4, respectively. $\alpha_1$ has been found to be 0.190 nGy/count for a given anthracene scintillator 4 in the case of X-radiation and 0.091 nGy/count for a given p-terphenyl scintillator 4 in the case of X-radiation.

The proportionality factor $\alpha_1$ is thus predetermined for a given scintillator 4, a given light output a and a given type of radiation. It is then placed into the data memory 28 as the predetermined parameter. According to an alternative embodiment, the determination device may comprise means for enabling a user to input this factor $\alpha_1$, for example, from a predetermined table, with the factor then being input into the analyzer 10.

According to the disclosure, the analyzer 10 is configured to determine a dose deposited in the scintillator 4 by the ionizing radiation only according to the intensity $I_{total}(E)$ of light measured by the photodetector 7 operating in single photon counting mode and a constant depending on the scintillator 4 used, the light output a of the determination device 1 and the type of the ionizing radiation only.

In particular, the analyzer 10 is so configured as to determine the ionizing dose $D_{ion}(E)$ deposited in the scintillator 4 by the ionizing radiation according to the intensity $I_{total}(E)$ of light measured by the photodetector 7 and the predetermined proportionality factor $\alpha_1$.

More particularly, the analyzer 10 is so configured as to determine the ionizing dose $D_{ion}(E)$ deposited in the scintillator 4 by the considered ionizing radiation by applying the following formula:

$$D_{ion}(E)=\alpha_1 \times I_{total}(E),$$

where
$\alpha_1$ is the aforementioned proportionality factor stored in the data memory 28;
$I_{total}(E)$ is the total intensity of light measured by the photodetector 7;
E is the energy of the incident ionizing radiation.

The ionizing dose $D_{ion}(E)$ is the dose currently taken into account in the standards for radiation protection and, in particular, the Euratom 2013/59 standard, which specifies the acceptable limits in terms of irradiation dose. This is the dose measured by the ionization chambers commonly used in the field of dosimetry.

According to an alternative embodiment or optionally, the analyzer 10 is so configured as to determine the excitation dose $D_{exc}(E)$ deposited in the scintillator 4 by the ionizing radiation as a function of the total intensity $I_{total}(E)$ measured by the photodetector 7 and a predetermined parameter $\alpha_2$, which depends on the scintillator 4, the light output a of the determination device 1 and on the type of the ionizing radiation only.

More particularly, the analyzer 10 is so configured as to determine the excitation dose $D_{exc}(E)$ by applying the following formula: $D_{exc}(E)=\alpha_2 \times I_{total}(E)$.

In this formula, $\alpha_2$ is a predetermined constant that depends on the scintillator 4, the light output a of the determination device 1 and the type of the ionizing radiation only. It is, in particular, obtained by calculation by applying the following formula:

$$\alpha_2 = \left(\frac{1}{\rho V Q a} - \alpha_1\right),$$

where $\rho$ is the specific gravity of the scintillator 4, expressed in kg/m$^3$, V is the irradiated volume of the scintillator 4, expressed in kg/m$^3$ and Q is the total fluorescence yield expressed as the total number of fluorescence photons emitted by the scintillator 4 per unit of deposited energy, i.e., J$^{-1}$. The total fluorescence yield Q is a value specific to the scintillator 4, known in the literature. The irradiated volume V depends on the type of radiation and can be determined by the skilled person without particular difficulties according to the depth of penetration of the considered radiation.

The constant $\alpha_2$ is predetermined for a given determination device 1 according to the type of the ionizing radiation used. It is stored in the data memory 28 of the processing unit 27 as the predetermined parameter. For example, the data memory 28 includes a table of constants $\alpha_2$ for different types of ionizing radiations that may be used, for example, X-radiation, gamma radiation, alpha radiation, protons, neutrons, ions, etc.

Illustratively, for an anthracene sample having a mass $M=\rho V=2.8 \cdot 10^{-6}$ kg, with $\alpha_1=0.193$ nGy/count, $Q=1.25 \cdot 10^{17}$ photons/J and $a=10^{-2}$, we obtain: $1/\rho V Q a=0.286$ nGy/count, $\alpha_2=0.091$ nGy/count.

In an alternative or optional embodiment, the analyzer 10 is so configured as to determine the total dose $D=I_{total}(E)$ deposited in the scintillator 4 by the ionizing radiation according to the total intensity $I_{total}(E)$ of light measured by the photodetector 7 and a predetermined constant $\alpha_3$ depending on the scintillator 4, the light output of the determination device 1 and the type of the ionizing radiation only.

The total dose $D_{total}(E)$ is the sum of the ionizing dose $D_{ion}(E)$ and the excitation dose $D_{exc}(E)$, with the ionizing dose $D_{ion}(E)$ resulting from the ionization of the scintillating molecules of the scintillator 4 by the ionizing radiation, whereas the excitation dose $D_{exc}(E)$ results from the non-ionizing excitation of the scintillating molecules of the scintillator 4 by the ionizing radiation.

In particular, the analyzer 10 is so configured as to determine the total dose $D_{total}(E)$ by applying the following formula:

$$D_{total}(E)=\alpha_3 \times I_{total}(E),$$

where
E is the energy of the incident radiation,
$I_{total}(E)$ is the total intensity of light measured by the photodetector (7); and
$\alpha_3$ is a predetermined constant depending on the scintillator 4, the light output a of the determination device 1 and the type of the ionizing radiation only.

More specifically, $\alpha_3=\alpha_1+\alpha_2$ where $\alpha_1$ and $\alpha_2$ are predetermined constants defined above.

The constant $\alpha_3$ is predetermined for a given determination device 1 according to the type of the ionizing radiation used. It is stored in the data memory 28 of the processing unit 27 as the predetermined parameter. For example, the data memory 28 includes a table of constants $\alpha_3$ for different types of ionizing radiations that may be used, for example, X-radiation, gamma radiation, alpha radiation, protons, neutrons, ions, etc.

The determination device 1 according to these optional or alternative embodiments thus has the advantage of making it possible to determine, in an extremely simple manner, the ionizing dose $D_{ion}(E)$, the excitation dose $D_{exc}(E)$ and/or the total dose $D_{total}(E)$ deposited in the scintillator 4.

The excitation dose $D_{exc}(E)$ and the total dose $D_{total}(E)$, with the latter including the excitation dose, are not currently being taken into account by the radiation protection standards. Now, knowing the excitation dose $D_{exc}(E)$ and the total dose $D_{total}(E)$ results in a more complete image of the dose deposited in the scintillator 4 than just knowing the ionizing dose $D_{ion}(E)$.

For example, for a scintillator 4 made of anthracene, having a mass $M=\rho V=2.8 \cdot 10^{-6}$ kg, as mentioned above, an X-ray beam of 120 keV, the photodetector 7 measures $I_{total}(E)=2.2 \times 10^{-4}$ counts.

From $I_{total}(E)$ and the parameters a and $\alpha_1$ saved in the memory 28 of the processing unit 27, the analyzer 10 then determines that $D_{ion}(E)=4.25$ µGy, $D_{exc}(E)=2.04$ µGy and $D_{total}(E)=6.29$ µGy.

In this case, it can be seen that the ratio $D_{exc}(E)/D_{ion}(E)=0.48$, whereas the ratio $I_{exc}(E)/I_{ion}(E)=14.06$. The ionizing dose then represents, in this case, 67.6% of the total dose deposited. As for the excitation dose, it represents 31.4% of the total dose deposited, which corresponds to a non-negligible contribution to the total dose received by the scintillator 4.

The determination device 1, according to the invention, is particularly advantageous. As a matter of fact, it enables a very precise determination of the dose received by the scintillator 4, while being inexpensive and particularly sensitive.

As a matter of fact, the inventors of the present disclosure have surprisingly discovered that the dose deposited in the scintillator 4 can be accurately determined from measurements made by a single photodetector 7, provided that such photodetector 7 operates in single photon counting mode and with a low noise, i.e., has a noise lower than or equal to 1% of the total signal counted. As a matter of fact, the inventors have found that, for a low-noise photodetector 7, the operation of the photodetector 7 in single photon counting mode is sufficient to ensure, over a wide range of deposited doses, a linear relationship between the total dose $D_{total}(E)$ deposited in the scintillator 4 and the total intensity of the total scintillation light $I_{total}(E)$ measured by the photodetector 7, as well as between the ionizing dose $D_{ion}(E)$ or the excitation dose $D_{exc}(E)$ and the total intensity of the scintillation light $I_{total}(E)$ measured by the photodetector 7. In addition, the inventors have found that, in this case, the respective proportionality constants $\alpha_1$, $\alpha_2$, $\alpha_3$ depend on the scintillator 4, the light output a of the determination device 1, and the type of the ionizing radiation only and can be predetermined for a given determination device 1 according to the type of the ionizing radiation used.

Such findings make it possible to simplify the determination device as compared to the one described, for example, in the prior patent application EP 2 771 716, which requires two separate photodetectors for accurately determining the ionizing dose $D_{ion}(E)$.

In addition, the determination device 1 according to the disclosure is more sensitive than the one described in the prior patent application EP 2 771 716, while having a similar measurement accuracy. As a matter of fact, in the determination device 1, a greater portion of the light from the scintillator 4 is used by the photodetector 7 for determining the dose deposited in the scintillator 4 than in the method described in the prior patent application EP 2 771 716, wherein only a small fraction of the scintillation photons is useful, since coincidence events only are counted.

In particular, the sensitivity of the determination device 1 according to the disclosure is less than or equal to one nanoGray.

In addition, with the determination device 1 according to the disclosure, determining the deposited dose requires no time, whether total or partial, reconstitution, of a fluorescence decline, which results in a great simplicity of the determination device 1 as regards the electronics and energy consumption, but also as regards the size and portability thereof.

Eventually, the determination device 1 according to the disclosure is very compact. For example, the processing unit 27 and the photodetector 7 can be accommodated in a protective housing 22 having a side not exceeding 15 cm.

The disclosure also relates to a method for determining the dose deposited in the scintillator 4 by an ionizing radiation, comprising:
measuring, using a single photodetector 7 operating in single photon counting mode and with a low noise, the intensity $I_{total}(E)$ of the scintillation light received by the photodetector 7; and
determining, using an analyzer 10, a total dose $D_{total}(E)$, an excitation dose $D_{exc}(E)$ or an ionizing dose $D_{ion}(E)$, deposited in the scintillator 4 by the ionizing radiation only from the light intensity $I_{total}(E)$ measured by the single photodetector 7 and a predetermined constant depending on the scintillator 4, the light output of the determination device a and the type of the ionizing radiation.

According to one embodiment, the step of determination comprises determining, using the analyzer 10, the ionizing dose $D_{ion}(E)$ deposited in the scintillator 4 by the ionizing radiation only from the light intensity $I_{total}(E)$ measured by the single photodetector 7 and a predetermined constant $\alpha_1$ depending on the scintillator 4, the light output a of the determination device 1 and the type of the ionizing radiation.

More particularly, such determination method is implemented using the determination device 1 as described above.

During the step of determination, the analyzer 10 determines the ionization dose $D_{ion}(E)$ deposited in the scintillator 4 by applying the following formula:

$$D_{ion}(E) = \alpha_1 \times I_{total}(E)$$

where
$\alpha_1$ is the predetermined constant defined above;
$I_{total}(E)$ is the total light intensity measured by the photodetector 7;
E is the energy of the incident ionizing radiation.

According to an alternative embodiment or optionally, the step of determination comprises the determination, using an analyzer 10, the excitation dose $D_{exc}(E)$ deposited in the scintillator 4 by the ionizing radiation only from the light intensity $I_{total}(E)$ measured by the single photodetector 7 and a predetermined constant depending on the scintillator 4, the light output a of the determination device 1 and the type of the ionizing radiation.

More particularly, this determination method is implemented using the determination device 1 as described above.

During the step of determination, the analyzer 10 determines the excitation dose $D_{exc}(E)$ by applying the following formula:

$$D_{exc}(E) = \alpha_2 \times I_{total}(E),$$

where
$I_{total}(E)$ is the total intensity measured by the photodetector 7 and
$\alpha_2$ the predetermined constant described above.

According to an alternative embodiment or optionally, the step of determination comprises the determination, using the analyzer 10, of the total dose $D_{total}(E)$ deposited in the scintillator 4 by the ionizing radiation only from the light intensity $I_{total}(E)$ measured by the single photodetector 7 and a predetermined constant $\alpha_3$ depending on the scintillator 4, the light output and the type of the ionizing radiation.

More particularly, such determination method is implemented using the determination device 1 as described above.

During the step of determination, the analyzer 10 determines the total dose $D_{total}$ by applying the following formula: $D_{total}(E) = \alpha_3 \times I_{total}(E)$, where $I_{total}(E)$ is the total intensity measured by the photodetector 7 and $\alpha_3$ is the predetermined constant previously defined.

Such determination method has the advantages mentioned above regarding the determination device 1.

The invention claimed is:

1. A determination device for determining a dose deposited in a scintillator by an ionizing radiation, comprising:
a scintillator so configured as to be irradiated by the ionizing radiation and capable of emitting scintillation photons during the interaction with the ionizing radiation;
a measurement device comprising a single photodetector, the photodetector being a low-noise photodetector, the determination device being configured in such a way that the photodetector operates in single photon counting mode, the photodetector supplying, at an outlet of the photodetector, a measurement of the total intensity ($I_{total}(E)$) of light received by the photodetector from the scintillator, and
an analyzer configured to determine a dose deposited in the scintillator by the ionizing radiation only from the total intensity ($I_{total}(E)$) of light measured by the photodetector and a predetermined constant ($\alpha_1$, $\alpha_2$, $\alpha_3$) depending only on the scintillator, the light output of the determination device and the type of the ionizing radiation.

2. The determination device according to claim 1, wherein the analyzer is so configured as to determine:
the ionizing dose ($D_{ion}(E)$) deposited in the scintillator by the ionizing radiation by applying the following formula: $D_{ion}(E)=\alpha_1 \times I_{total}(E)$, where E is the energy of the incident ionizing radiation, $I_{total}(E)$ is the total intensity of light measured by the photodetector and $\alpha_1$ is a predetermined constant depending on the scintillator, the light output of the determination device and the type of the ionizing radiation only; and/or
the exciting dose ($D_{exc}(E)$) deposited in the scintillator by applying the following formula: $D_{exc}(E)=\alpha_2 \times I_{total}(E)$, where E is the energy of the incident radiation, $I_{total}(E)$ is the total intensity of light measured by the photodetector and $\alpha_2$ is a predetermined constant depending on the scintillator, the light output of the determination device and the type of the ionizing radiation only; and/or
the total dose ($D_{total}(E)$) deposited in the scintillator by applying the following formula: $D_{total}(E)=\alpha_3 \times I_{total}(E)$, where E is the energy of the incident radiation, $I_{total}(E)$ is the total intensity of light measured by the photodetector and $\alpha_3$ is a predetermined constant depending on the scintillator, the light output of the determination device and the type of the ionizing radiation only.

3. The determination device according to claim 2, wherein the predetermined constant $\alpha_2$ is calculated by applying the following formula:

$$\alpha_2 = \left(\frac{1}{\rho V Q a} - \alpha_1\right),$$

where $\rho$ is the specific gravity of the scintillator, expressed in kg/m$^3$, V is the irradiated volume of the scintillator, expressed in m$^3$, Q is the total fluorescence yield expressed as the total number of fluorescence photons emitted by the scintillator per unit of deposited energy, i.e., in J$^{-1}$ and $\alpha_1$ is a constant corresponding to the slope of a calibration line established for the type of the ionizing radiation considered and for the determination device, and giving the ionizing dose ($D_{ion}(E)$) measured for the scintillator using an ionization chamber according to the total intensity ($I_{total}(E)$) measured for the same scintillator, using the determination device.

4. The determination device according to claim 2, wherein the predetermined constant $\alpha_3$ is determined by applying the following formula: $\alpha_3=(\alpha_1+\alpha_2)$, where the predetermined constant $\alpha_2$ is calculated by applying the following formula:

$$\alpha_2 = \left(\frac{1}{\rho V Q a} - \alpha_1\right),$$

where $\rho$ is the specific gravity of the scintillator, expressed in kg/m$^3$, V is the irradiated volume of the scintillator, expressed in m$^3$, Q is the total fluorescence yield expressed as the total number of fluorescence photons emitted by the scintillator per unit of deposited energy, i.e., in J$^{-1}$ and $\alpha_1$ is a constant corresponding to the slope of a calibration line established for the type of the ionizing radiation considered and for the determination device, and giving the ionizing dose ($D_{ion}(E)$) measured for the scintillator using an ionization chamber according to the total intensity ($I_{total}(E)$) measured for the same scintillator, using the determination device.

5. The determination device according to claim 2, wherein, for one type of the ionizing radiation considered, the constant $\alpha 1$ corresponds to the slope of a calibration line established for the type of the ionizing radiation considered and for the determination device, and giving the ionizing dose ($D_{ion}(E)$) measured for the scintillator using an ionization chamber according to the total intensity ($I_{total}(E)$) measured for the same scintillator, using the determination device.

6. The determination device according to claim 5, wherein the predetermined constant $\alpha_2$ is calculated by applying the following formula:

$$\alpha_2 = \left(\frac{1}{\rho V Q a} - \alpha_1\right),$$

where $\rho$ is the specific gravity of the scintillator, expressed in kg/m$^3$, V is the irradiated volume of the scintillator, expressed in m$^3$, Q is the total fluorescence yield expressed as the total number of fluorescence photons emitted by the scintillator per unit of deposited energy, i.e., in J$^{-1}$ and $\alpha_1$ is a constant corresponding to the slope of a calibration line established for the type of the ionizing radiation considered and for the determination device, and giving the ionizing dose ($D_{ion}(E)$) measured for the scintillator using an ionization chamber according to the total intensity ($I_{total}(E)$) measured for the same scintillator, using the determination device.

7. The determination device according to claim 6, wherein the predetermined constant $\alpha_3$ is determined by applying the following formula: $\alpha_3=(\alpha_1+\alpha_2)$, where the predetermined constant $\alpha_2$ is calculated by applying the following formula:

$$\alpha_2 = \left(\frac{1}{\rho V Q a} - \alpha_1\right),$$

where $\rho$ is the specific gravity of the scintillator, expressed in kg/m$^3$, V is the irradiated volume of the scintillator, expressed in m$^3$, Q is the total fluorescence yield expressed as the total number of fluorescence photons emitted by the scintillator per unit of deposited energy, i.e., in J$^{-1}$ and $\alpha_1$ is a constant corresponding to the slope of a calibration line established for the type of the ionizing radiation considered and for the determination device, and giving the ionizing dose ($D_{ion}(E)$) measured for the scintillator using an ionization chamber according to the total intensity ($I_{total}(E)$) measured for the same scintillator, using the determination device.

8. The determination device according to claim 7, wherein the measuring device further comprises an attenuator intended to attenuate the incident radiation on the photodetector so as to ensure the operation of the photodetector in single photon counting mode.

9. The determination device according to claim 8, wherein the attenuator comprises:
an upstream attenuator arranged upstream from the scintillator and so configured as to absorb a portion of the incident ionizing radiation on the scintillator; and/or a downstream attenuator arranged downstream from the scintillator between the scintillator and the photodetector and so configured as to absorb a portion of the radiation emitted by the scintillator toward the photodetector.

10. The determination device according claim 9, wherein the attenuator comprises an element made of a material capable of absorbing the incident ionizing radiation, with the element being arranged upstream from the scintillator in the path of the incident radiation on the scintillator.

11. The determination device according to claim 10, wherein the attenuator comprises a diaphragm arranged at a photodetector inlet, with a physical aperture having an area smaller than a physical aperture of the photodetector.

12. The determination device according to claim 11, wherein the scintillator is an organic scintillator.

13. The determination device according to claim 12, further comprising a transmission member configured so as to transmit the scintillation photons emitted by the scintillator to the photodetector.

14. A method for determining a dose deposited in a scintillator by an ionizing radiation using the determination device according to claim 13, comprising:

measuring, using a single photodetector operating in single photon counting mode and with low noise, the total intensity ($I_{total}(E)$) of light received by the photodetector; and determining, using an analyzer, a dose deposited in the scintillator by the ionizing radiation from the total intensity ($I_{total}(E)$) of light measured by the photodetector only and a predetermined constant ($\alpha_1$, $\alpha_2$, $\alpha_3$) depending on the scintillator, the light output of the determination device and the type of the ionizing radiation only.

15. The determination method according to claim 14, wherein the step of determination comprises:

the determination of the ionizing dose ($D_{ion}(E)$) deposited in the scintillator by the ionizing radiation by applying the following formula:

$$D_{ion}(E) = \alpha_1 \times I_{total}(E)$$

where $\alpha_1$ is a predetermined constant depending on the scintillator, the light output of the determination device and the type of the ionizing radiation only;

$I_{total}(E)$ is the total intensity of light measured by the photodetector, and/or determining the exciting dose ($D_{exc}(E)$) deposited in the scintillator by the ionizing radiation by applying the following formula:

$$D_{exc}(E) = \alpha_2 \times I_{total}(E),$$

where $I_{total}(E)$ is the total intensity of light measured by the photodetector and $\alpha_2$ is a predetermined constant depending on the scintillator, the light output of the determination device and the type of the ionizing radiation only; and/or determining the total dose ($D_{total}(E)$) deposited in the scintillator by the ionizing radiation by applying the following formula:

$$D_{total}(E) = \alpha_3 \times I_{total}(E),$$

where $I_{total}(E)$ is the total intensity of light measured by the photodetector; and $\alpha_3$ is a predetermined constant depending on the scintillator, the light output of the determination device and the type of the ionizing radiation only.

16. The determination device according claim 8, wherein the attenuator comprises an element made of a material capable of absorbing the incident ionizing radiation, with the element being arranged upstream from the scintillator in the path of the incident radiation on the scintillator.

17. The determination device according to claim 1, wherein the measuring device further comprises an attenuator intended to attenuate the incident radiation on the photodetector so as to ensure the operation of the photodetector in single photon counting mode.

18. The determination device according to claim 1, wherein the scintillator is an organic scintillator comprising p-terphenyl or anthracene.

19. The determination device according to claim 1, further comprising a transmission member so configured as to transmit the scintillation photons emitted by the scintillator to the photodetector.

20. A method for determining a dose deposited in a scintillator by an ionizing radiation using the determination device according to claim 1, comprising:

measuring, using a single photodetector operating in single photon counting mode and with low noise, the total intensity ($I_{total}(E)$) of light received by the photodetector; and determining, using an analyzer, a dose deposited in the scintillator by the ionizing radiation from the total intensity ($I_{total}(E)$) of light measured by the photodetector only and a predetermined constant ($\alpha_1$, $\alpha_2$, $\alpha_3$) depending on the scintillator, the light output of the determination device and the type of the ionizing radiation only.

* * * * *

UNITED STATES PATENT AND TRADEMARK OFFICE
CERTIFICATE OF CORRECTION

PATENT NO. : 10,386,499 B2
APPLICATION NO. : 15/773722
DATED : August 20, 2019
INVENTOR(S) : Jean-Marc Jung and Mauricio Nicolas Torres Ruiz It is certified that error appears in the above-identified patent and that said Letters Patent is hereby corrected as shown below:

In the Specification

Column 1, Line 8, change "PCT/CA2016/" to --PCT/EP2016/--

Signed and Sealed this
Fourteenth Day of January, 2020

Andrei Iancu
*Director of the United States Patent and Trademark Office*